United States Patent
Zhang et al.

(10) Patent No.: US 9,983,054 B2
(45) Date of Patent: May 29, 2018

(54) ULTRAVIOLET LIGHT SENSING CIRCUIT AND SENSING SYSTEM

(71) Applicant: PEKING UNIVERSITY SHENZHEN GRADUATE SCHOOL, Shenzhen (CN)

(72) Inventors: Shengdong Zhang, Shenzhen (CN); Congwei Liao, Shenzhen (CN); Zhijin Hu, Shenzhen (CN); Wenjie Li, Shenzhen (CN); Junmei Li, Shenzhen (CN)

(73) Assignee: Peking University Shenzhen Graduate School, Shenzhen, Guangdong (CN)

( * ) Notice: Subject to any disclaimer, the term of this patent is extended or adjusted under 35 U.S.C. 154(b) by 166 days.

(21) Appl. No.: 15/123,239

(22) PCT Filed: Nov. 14, 2014

(86) PCT No.: PCT/CN2014/091061
§ 371 (c)(1),
(2) Date: Sep. 1, 2016

(87) PCT Pub. No.: WO2015/131545
PCT Pub. Date: Sep. 11, 2015

(65) Prior Publication Data
US 2017/0074722 A1    Mar. 16, 2017

(30) Foreign Application Priority Data
Mar. 5, 2014  (CN) .......................... 2014 1 0079248

(51) Int. Cl.
*G01J 1/44*    (2006.01)
*G01J 1/42*    (2006.01)

(52) U.S. Cl.
CPC ................. *G01J 1/44* (2013.01); *G01J 1/429* (2013.01)

(58) Field of Classification Search
CPC ....................................... G01J 1/44; G01J 1/42
See application file for complete search history.

(56) References Cited

U.S. PATENT DOCUMENTS

| | | | | |
|---|---|---|---|---|
| 6,590,698 B1 * | 7/2003 | Ohtsuki | ................... | G02B 6/14 |
| | | | | 359/326 |
| 7,126,745 B2 * | 10/2006 | Ohtsuki | ................... | G02B 6/14 |
| | | | | 359/328 |

(Continued)

FOREIGN PATENT DOCUMENTS

| CN | 102891150 | 1/2013 |
|---|---|---|
| CN | 102904535 | 1/2013 |

(Continued)

OTHER PUBLICATIONS

English translation from WIPO of International Written Opinion dated Jan. 28, 2015.

(Continued)

*Primary Examiner* — David Porta
*Assistant Examiner* — Djura Malevic
(74) *Attorney, Agent, or Firm* — Ladas & Parry, LLP

(57) ABSTRACT

An ultraviolet light sensing circuit and sensing system. The ultraviolet light sensing circuit comprises a modulation unit and a phase delay unit, wherein the modulation unit comprises a first stage of inverter which is used for sensing ultraviolet light and is used as a voltage feedback modulation stage; and the phase delay unit comprises N stages of inverters which are connected in sequence, where N is an even number which is greater than or equal to 2. The modulation unit is connected to the phase delay unit in sequence, and the output voltage of the phase delay unit is fed to the modulation unit; and the modulation unit is modulated by a control signal which is a pulse signal. The ultraviolet light sensing circuit and sensing system can be used for ultraviolet light information communications. The (Continued)

ultraviolet light sensing circuit can sense ultraviolet light signals and output amplitude modulation wave signals.

14 Claims, 4 Drawing Sheets

(56) References Cited

U.S. PATENT DOCUMENTS

| | | | | |
|---|---|---|---|---|
| 7,277,220 | B2 * | 10/2007 | Ohtsuki | G02B 6/14 |
| | | | | 359/326 |
| 2006/0231882 | A1 * | 10/2006 | Kim | H01L 27/14643 |
| | | | | 257/310 |
| 2011/0163796 | A1 * | 7/2011 | Floyd | H03K 17/08122 |
| | | | | 327/536 |

FOREIGN PATENT DOCUMENTS

| | | |
|---|---|---|
| CN | 102331297 | 9/2013 |
| JP | 2013195187 | 9/2013 |

OTHER PUBLICATIONS

PCT International Preliminary Examination Report on Patentability dated Sep. 6, 2016 and its official English translation from WIPO.
International Search Report for PCT/CN2014/091061dated Jan. 28, 2015 and its English translation provided by WIPO.
Written Opinion of the International Search Authority for PCT/CN2014/091061 dated Jan. 28, 2015.
Jiang, Shaojun et al., "Design of Flame Detector Based on Ultraviolet Photodiode", Instrument Technique and Sensor, vol. 2013, No. 2, Dec. 3, 2013, pp. 34, 35 and 61 (with English translation from Google Translate).

* cited by examiner

ULTRAVIOLET LIGHT SENSING CIRCUIT AND SENSING SYSTEM

CROSS REFERENCE TO RELATED APPLICATIONS

The present application is the U.S. national phase of PCT Application No. PCT/CN2014/091061 filed on Nov. 14, 2014, which claims priority to Chinese Patent Application No. 201410079248.1 filed on Mar. 5, 2014 and entitles "ULTRAVIOLET LIGHT SENSING CIRCUIT AND SENSING SYSTEM", the disclosures of which are incorporated herein by reference in their entireties.

TECHNICAL FIELD

The present disclosure relates to the ultraviolet detection field, more particularly, to an ultraviolet light sensing circuit and sensing system.

BACKGROUND

Compared with the conventional infrared or visible light detectors or sensors, the high-energy UV-light detectors or sensors have many advantages, such as strong ability to anti-interference, reduced probability of false triggering or alarming events, etc. Thus UV-light detection and sensing technology are widely used in the flame and thermal sensor, missile tail flame detection, forest fire detection and explosion gas detection. Taking detection of gas explosion as an example, there is high-energy radiation with different spectrum releasing before the gas explosion. And there is abundant information in the radiated rays, such as the ultraviolet ray. Through the detection of high energy X-ray, we can predict the occurrence of disaster in advance and then reduce the loss of life and property. Due to the high energy of the UV light, the semiconductor devices with wide band gap must be used. The mentioned wide band gap semiconductors include gallium arsenide (GaAs), gallium nitride (GaN) and so on. However, the process of semiconductor devices with wide band gap semiconductor materials are complicated and high processing temperature is required, and it is not suitable for large-area manufacturing.

In recent years, many ultraviolet detectors integrated with oxide TFT were emerged. Due to the rapid development of the flat panel display technology, indium gallium zinc oxide (IGZO) TFT has recently become the research hotpots. The silicon TFT technology may be replaced by IGZO TFTs which is regarded as the mainstream of the next generation TFT. It is noteworthy that, when IGZO and other oxides are exposed to ultraviolet light, the electrical characteristics of the oxide TFT may be changed significantly. For example, the threshold voltage will be decreased, and the off-current will be increased by orders of magnitude. Therefore, the UV detector can be realized by taking advantage of optical and electrical characteristic of Oxide TFTs. In addition, the oxide TFT has many advantages, for example, the manufacturing process is relatively simple, and the processing temperature is low, and it is suitable for large area production. The function of oxide TFT UV detection may even be implemented in the display panel, thus system integration on the display panel (system on panel, SOP) can be realized. So the UV light intensity of environment can be read by the display panel, and even the profile of the ultraviolet-emitting objects can be demonstrated. Thus it is suitable for the early detection of light emission or explosion with strong sunlight or infrared background.

Up to now, there has not been a mature scheme of ultraviolet light sensing circuit based on oxide TFT. Especially in applications of the early warning of forest fire or gas explosion, the detection of ultraviolet signal and the transmission of detected ultraviolet signal are still serious problems that are in urgent to be solved.

SUMMARY

The purpose of the present disclosure is to provide an ultraviolet light sensing circuit and a sensing system which have the capabilities of sensing ultraviolet light and outputting amplitude modulated waves.

According to the first aspect of the present disclosure, an ultraviolet light sensing circuit is provided in an embodiment, which comprises a modulation unit and a phase delay unit;

The modulation unit comprises the first stage of inverter which is used for sensing ultraviolet light, and the first stage of inverter is also used as a voltage feedback modulation stage;

The phase delay unit comprises stages of inverters which are connected in series, and N is an even number which is greater than or equal to 2;

The modulation unit is connected to the phase delay unit in series, and the output voltage of the phase delay unit is feedback to the modulation unit; and the modulation unit can be tuned by the control signal with pulse waveforms.

As a preferred embodiment, the ultraviolet light sensing circuit also comprises an output buffer unit which comprises the N+2 stages of inverters, and the driving capability to the load on the output terminal can be improved by the output buffering unit.

In one embodiment, a pull-up and pull-down module is included in the first stage of inverter;

A first transistor and a second transistor are included in the pull-up module, and the control electrode and the first electrode of the first transistor are all coupled to the control signal; the control electrode of the second transistor is coupled to the second electrode of the first transistor, and the first electrode of second transistor is coupled to the control signal;

A third transistor, a fourth transistor, a fifth transistor and a sixth transistor are included in the pull-down module. And the control electrode of the third transistor is coupled to the second electrode, and a first electrode is coupled to the second electrode of the first transistor; a control electrode of the fourth transistor is coupled to the second electrode, and a first electrode is coupled to the second electrode of the first transistor; the control electrode of the fifth transistor is coupled to the output terminal of the N-stages of inverters, the first electrode is coupled to the second electrode of the third transistor, and the second electrode is coupled to a low level voltage source; the control electrode of the sixth transistor is coupled to the output terminal of N stages of inverters, the first electrode is coupled to the second electrode of the fourth transistor, and the second electrode is coupled to a low level voltage source;

The third transistor and the fourth transistor are the UV sensing transistors.

As an embodiment, the circuit structure of each inverter in the N-stages of inverters is the same, including the seventh transistor, the eighth transistor, the ninth transistor and the tenth transistor;

The control electrode of the seventh transistor is coupled to the control signal; the control electrode of the eighth transistor is coupled to the second electrode of the seventh transistor, and the first electrode of the eighth transistor is coupled to the control signal; the control electrode of the ninth transistor is coupled to the second electrode of the second transistor, and the first electrode is coupled to the second electrode of the seventh transistor, and the second electrode is coupled to the low level voltage source; the control electrode of the tenth transistor is coupled to the control electrode of the ninth transistor, and the first electrode is coupled to the second electrode of the eighth transistor, and the second electrode is coupled to a low level voltage source.

As an embodiment, the ninth transistor and the tenth transistor are the UV sensing transistors.

In an embodiment, the first stage of inverter comprises a pull-up and pull-down module;

A first transistor and a second transistor are included in the pull-up module, the first transistor control electrode and the first electrode is coupled to the control signal; the control electrode of the second transistor is coupled to the second electrode of the first transistor, and the first electrode of the second transistor is coupled to the control signal.

A third transistor, a fourth transistor, a fifth transistor and a sixth transistor are included in the pull-down module, the control electrode of the third transistor is coupled to the first control signal, and the first electrode is coupled to the second electrode of the first transistor; the control electrode of the fourth transistor is coupled to the first control signal, and the first electrode is coupled to the second electrode of the second transistor; the output terminal of the fifth transistor is coupled to the control of N stages of inverters, the first electrode is coupled to the second electrode of the third transistor, and the second electrode is coupled to a low level voltage source; the control electrode of the sixth transistor is coupled to the output terminal of N stages of inverters, the first electrode is coupled to the second electrode of the fourth transistor, and the second electrode is coupled to a low level voltage source;

The third transistor and the fourth transistor are UV sensing transistors.

In an embodiment, pull-up and pull-down modules are included in the first stage of inverter;

A first transistor and a second transistor are included in the pull-up module, the control electrode and the first electrode of the first transistor are coupled to the high level signal; the control electrode of the second transistor is coupled to the second electrode of the first transistor, and the first electrode of the second transistor is coupled to the high level signal;

A third transistor, a fourth transistor, a fifth transistor, a sixth transistor and a fifteenth transistor are included in the pull-down module. The control electrode of the third transistor is coupled to the control signal, and the first electrode is coupled to the second electrode of the first transistor; the control electrode of the fourth transistor is coupled to the control signal, and the first electrode is coupled to the second electrode of the second transistor; the control electrode of the fifth transistor is coupled to the output terminal of N stages of inverters, the first electrode is coupled to the second electrode of the third transistor; the control electrode of the sixth transistor is coupled to the output terminal of N stages of inverters, the first electrode is coupled to the second electrode of the fourth transistor; the first electrode of the fifteenth transistor is coupled to the second electrode of the fifth transistor and the second electrode of the sixth transistor, the control electrode of the fifteenth transistor and the second electrode are coupled to the low voltage source, and the fifteenth transistor is an ultraviolet sensing transistor.

In an embodiment, the eleventh transistor, the twelfth transistor, transistor 13 and 14 transistors are included in the N+2 stages of inverters.

The control electrode and the first electrode of the eleventh transistor are coupled to the control signal; the control electrode of the twelfth transistor is coupled to the second electrode of the eleventh transistor, and the first electrode of the twelfth transistor is coupled to the control signal, the second electrode of the twelfth transistor is coupled to the output terminal; the control electrode of the thirteenth transistor is coupled to the output terminal of N stages of inverters, the first electrode of the thirteenth transistor is coupled to the second electrode of the eleventh transistor, and the thirteenth electrode of the second transistor is coupled to a low level voltage source; the control electrode of the fourteenth transistor is coupled to the output terminal of N stages of inverters, the first electrode of the fourteenth transistor is coupled to the second electrode of the twelfth transistor, and the thirteenth electrode of the second transistor is coupled to a low level voltage source.

As an embodiment, the ultraviolet sensing transistor is a zinc based oxide thin film transistor.

According to the second aspect of the present disclosure, an ultraviolet light sensing system is provided in one embodiment. And the ultraviolet light sensing system comprises an ultraviolet signal transmitter, an ultraviolet signal receiver and an ultraviolet light sensing circuit as claimed in the first aspect of the present disclosure;

The output terminal of the ultraviolet light sensing circuit is coupled to the UV signal transmitter, which is used to transmit output signal of the ultraviolet light sensing circuit. And the ultraviolet signal receiver is used to receive the signal from the ultraviolet light signal transmitter. And according to the received signal, the ultraviolet signal receiver will judge whether there is UV irradiation in the ultraviolet light sensing circuit or not.

As an embodiment, the ultrasonic transducer is used as ultraviolet signal transmitter. According to the output voltage signal of ultraviolet light sensing circuits, ultrasonic signal can be generated and transmitted through the ultraviolet signal transmitter. Ultraviolet signal receiver receives the ultrasonic signal, restores the ultrasonic signal into electric signal, and according to the electrical signal, judges whether there is the existence UV irradiation in the ultraviolet light sensing circuit or not.

According to an embodiment of this disclosure, a modulation unit in the ultraviolet light sensing circuit comprises the first stage of inverter, and the UV sensing transistor which is capable of sensing ultraviolet signal is included in the first stage inverter. The phase delay unit is sequentially composed of N stages of inverters, the output voltage of the phase delay unit is feedback back to the modulation unit, the first stage of inverter of the modulation unit is modulated by the controlled signal, the ultraviolet light sensing circuit can output amplitude modulation wave signals, which is convenient for long-distance wireless transmission.

DETAILED DESCRIPTION

The thought of this disclosure is that a large number of carriers can be induced in the active region of the UV sensing transistor when exposure to high energy UV light, so the threshold voltage of the UV sensing transistor is decreased, and the off-current is increased by orders of magnitude, in other words, the equivalent resistance of UV light sensing transistor can be modulated by UV light, so we can use the adjustable features of this resistance to design the sensing circuit.

First, some of the terminologies used in this disclosure are described. Depending on the structure, the transistor may be a field effect transistor (FET, Field Effect Transistor) or a bipolar junction transistor (BJT, Bipolar Junction Transistor). When the transistor is FET, the control electrode is gate electrode, the first electrode is a drain electrode, and the second electrode is a source electrode; when the transistor is BJT, the control electrode is the base, the first electrode is a collector, and the second electrode is the emitter. In this disclosure, zinc oxide thin film transistor is as an example for the ultraviolet light sensing. It is required that, for the convenience of description, in this disclosure, it is chosen that N=2, and the ultraviolet light sensing circuit comprises four cascaded inverters. But the ultraviolet light sensing circuit is not limited to 4 cascaded inverters. For actual use, excluding of the inverter output buffer, the required number of cascaded inverters should be greater than or equal to 3, and the value of inverter number should be odd to meet the oscillation conditions.

Figure 1:
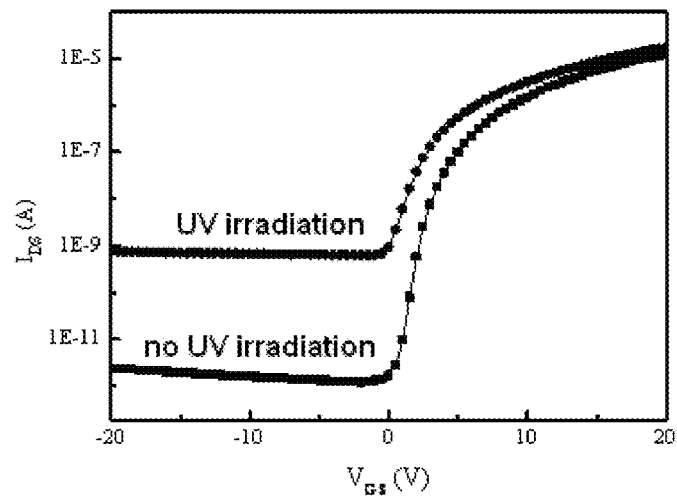
FIG. 1 is the I-V response curve of the oxide TFT in the case of UV and no UV irradiation.

FIG. 1 shows the I-V response curve of the oxide TFT in the case of UV and no UV irradiation. It is observed that, in the case there is no UV irradiation, the value of the threshold voltage of the oxide TFT is relatively large. While in the case of UV light exposing, the threshold voltage of the oxide TFT will be decreased, and the sub threshold region will be shifted toward the negative direction. Taking $V_{GS}$ equals 0 as an example, in the absence of UV irradiation, the value of $I_{DS}$ is about 1 pA; but the value of $I_{DS}$ will be increased to about 1 nA due to the expose of UV irradiation. When there is UV light, the value of $I_{DS}$ will be increased to about 1 nA. Due to the exposing of UV light, the sub-threshold current increases by three orders of magnitude. In other words, the on-resistance of the oxide TFT is decreased by three orders of magnitude due to the UV modulation. This disclosure is mainly taking advantage of the ultraviolet modulation effect on the on-resistance of TFT.

The embodiments of the present disclosure are further described below in detail with the accompanying drawings.

First Embodiment:

The ultraviolet light sensing circuit in the embodiment comprises a modulation unit and a phase delay unit, the modulation unit is connected to the phase delay unit in series, the output voltage of the phase delay unit is feedback to the modulation unit, and the modulation unit and the phase delay unit constitute the ring oscillator.

Figure 2:
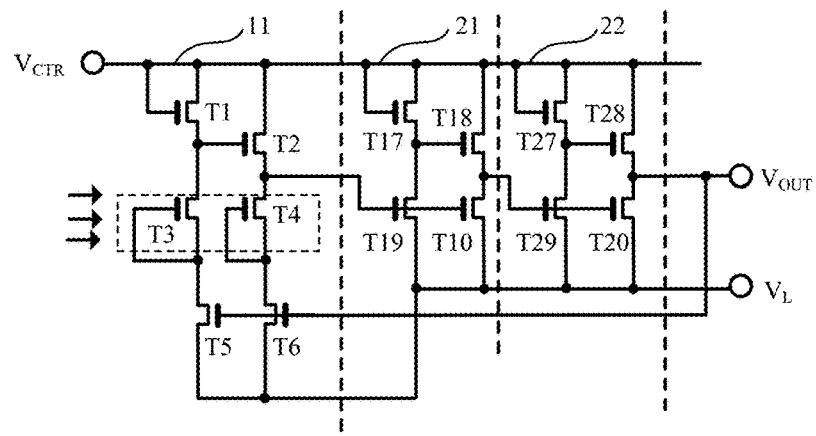
FIG. 2 is a circuit diagram of the ultraviolet light sensing circuit in a first embodiment of the present disclosure.

As shown in FIG. 2, in this embodiment, a first stage of inverter 11 for sensing UV is included in the modulation unit as the voltage feedback modulation level. The phase delay unit comprises N stages of inverters which are connected in series, the second stage of inverter to N+1 stages of inverters are included in the N inverters, where N is an even number which is greater than or equal to 2. In this embodiment, N=2, phase delay unit comprises second stage of inverter 21 and third stage of inverter 22, the first stage of inverter 11, second stage of inverter 21 and third stage of inverter 22 are connected in series, the output voltage of the third stage of inverter 22 is feedback to the first stage of inverter 21.

The first stage of inverter modulation unit 11 is modulated by the control signal $V_{CTR}$, the control signal $V_{CTR}$ is the pulse signal between the high and low level.

A pull-up and pull-down module are included in the first stage of inverter 11; a first transistor T1 and a second transistor T2 are included in the pull-up module, the control electrode of the first transistor T1 is coupled to the first electrode to the control signal $V_{CTR}$; the control electrode of the second transistor T2 is coupled to the second electrode of the first transistor T1, and the first electrode of the second transistor T2 is coupled to the control signal $V_{CTR}$; a third transistor T3, a fourth transistor T4, a fifth transistor T5 and a sixth transistor T6 are included in the pull-down module, the control electrode of the third transistor T3 is coupled to the second electrode, and the first electrode is coupled to the second electrode of the first transistor T1; the control electrode of the fourth transistor T4 is coupled to the second electrode, and the first electrode is coupled to the second electrode of the second transistor T2; the third transistor T3 and fourth transistor T4 are the UV sensing transistors. The control electrode of the fifth transistor T5 is coupled to the output $V_{OUT}$ of the third stage of inverter 22, the first electrode is coupled to a second electrode of the third transistor T3, and the second electrode is coupled to a low level voltage source $V_L$; the control electrode of the sixth transistor T6 is coupled to the output terminal $V_{OUT}$ of the third stage of inverter 22, the first electrode is coupled to a second electrode of the fourth transistor T4, and the second electrode is coupled to a low level voltage source $V_L$; the fifth transistor T5 and sixth transistors T6 received the feedback signal of the third stage of inverter 22, and then pull down the output terminal of the pull-up module to the low voltage level.

The first transistor T1 and the second transistor T2 constitutes a "Darlington" structure, during the pull-up process, output terminal can be pulled up with full swing through the bootstrapping effect of the second transistor T2. The pull-down module is divided into two parts, the first pull-down branch is composed of a third transistor T3 and a fifth transistor T5, and a second pull-down branch is composed of a fourth transistor T4 and a sixth transistor T6. And the first pull-down branch is used to pull down the internal nodes of the Darlington structure to a low level voltage, so it has the lower output voltage of the inverter, and the second pull-down branch is used to pull-down output node.

The structure of the second stage and the third stage of the inverter 21 and the inverter 22 circuit are the same. The second stage of inverter 21 is taken as an example to introduce the circuit structure, which include seventh transistor T17, eighth transistor T18, ninth transistor T19 and tenth transistor T10. And the pull-up part comprises seventh transistors T17 and eighth transistor T18, and the pull-down part comprises ninth transistors T19 and tenth transistors T10. The control electrode and the first electrode of the seventh transistor T17 are coupled to the control signal $V_{CTR}$; the control electrode of the eighth transistor T18 is coupled to the second electrode of the seventh transistor T17, and the first electrode of the eighth transistor T18 is coupled to the control signal $V_{CTR}$; the control electrode of the ninth transistor T19 is coupled to the second electrode of the second transistor T2, and the first electrode is coupled to the second electrode of the seventh transistor T17, the second electrode is coupled to a low level voltage source $V_L$. The control electrode of the tenth transistor T10 is coupled to the control electrode of the ninth transistor T19, and the first electrode is coupled to the second electrode of the eighth transistor T18, the second electrode is coupled to a low level voltage source $V_L$.

The control electrode of ninth transistor T29 and tenth transistor T20 in the third stage of inverter 22 are coupled to second electrode of the eighth transistor T18 in the second stage of inverter 21; the second electrode of the eighth transistor T28 in the third stage of inverter 22 is coupled to the output terminal, the output terminal $V_{OUT}$ is used as the output signal terminal of third stage of inverter 22 and ultraviolet light sensing circuit.

In the ultraviolet light sensing circuit of this embodiment, the first stage of inverter of the modulation unit comprises the third and fourth ultraviolet sensing transistor, UV light can be sensed by the circuit, and the output voltage of the third stage of inverter in the phase delay feedback to the first stage of inverter, thus the first to third stage of inverters comprises a ring oscillator circuit. When the ultraviolet light sensing transistor is irradiated with ultraviolet light, the ring oscillator can generate oscillation wave, the first inverter of the ring oscillator is modulated by controlled signal, the ultraviolet light sensing circuit can output amplitude modulated wave signal, and increase the wireless transmission distance of the signal, and the signal to the receiver is convenient.

Figure 3:
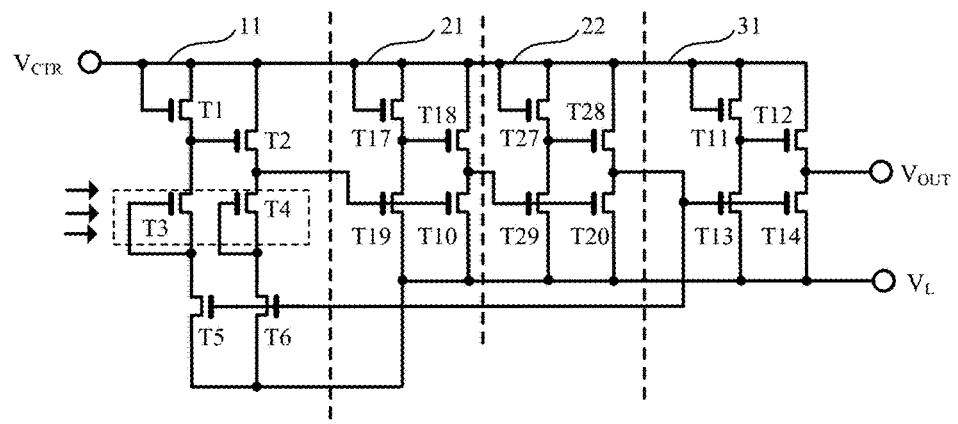
FIG. 3 is a circuit diagram of the ultraviolet light sensing circuit in a second embodiment of the present disclosure.

Second Embodiment:

In the first embodiment, there is serious "loading effect" for the ultraviolet light sensing circuits. In the case that the loading capacitance is larger than a certain critical value, the output terminal potential of the circuit is clamped at a fixed potential due to the loading capacitance. So the response speed of the circuit is slowed, and the output frequency of the ring oscillator is reduced or even the oscillating is terminated. In order to suppress the loading effect, being different with the first embodiment, the output buffer unit is added. The input terminal of the output buffer unit is coupled to the output terminal of the phase delay unit, and the output buffer unit comprises N+2 stages of inverters for driving the loading. As shown in FIG. 3, in this embodiment, the output buffer unit comprises the fourth stage of inverter 31. The ultraviolet light sensing circuit is composed of four cascade inverters, including the first stage of inverter 11, the second stage of inverter 21 and the third stage of inverter 22 and the fourth stage of inverter 31. The first stage of inverter 11 is the voltage feedback modulation stage, and the output of the third stage of inverter 22 is feedback to the first stage of inverter 11, and the ring oscillator is composed of the first inverter 11, second stage of inverter 21 and third stage of inverter 22; the fourth stage of inverter 31 is used as the output buffer, provided sufficient load driving capability.

Only additional explanations of the constitution and connection of the fourth stage of inverter 31 is added here, and the other part is the same with the first embodiment. So the similar contents are not repeated here. Eleventh transistor T11, twelfth transistor T12, thirteenth T13 and fourteenth transistor T14 are included in the fourth stage of inverter 31;

The control electrode and the first electrode of the eleventh transistor T11 are coupled to the control signal $V_{CTR}$; the control electrode of the twelfth transistor is coupled to the second electrode of the eleventh transistor T11, the first electrode of the twelfth transistor T12 is coupled to the control signal $V_{CTR}$, the second electrode of the twelve transistor T12 is coupled to the output terminal $V_{OUT}$; the control electrode of the thirteen transistor T13 is coupled to the output terminal of the third stage of inverter 22, the first electrode of the thirteenth transistor T13 is coupled to the second electrode of the eleventh transistor T11, the second electrode of the thirteenth transistor T13 is coupled to a low level voltage source $V_L$; the control electrode of the fourteenth transistor T14 is coupled to the control electrode of the thirteenth transistor T13, the first electrode of the fourteenth transistor T14 is coupled to the second electrode of the twelfth transistor T12, the second electrode of the thirteenth transistor T13 is coupled to a low level voltage source $V_L$.

According to whether there is ultraviolet light or not, operating principal of the ultraviolet light sensing circuit is described as follows.

(1) In the Case of UV Irradiation

Due to the exposing of UV light, as the number of the photo-generated carriers in the third transistor T3 and fourth transistor T4 is increased rapidly, the conduction capability of the third transistor T3 and fourth transistor T4 is increased. A ring oscillator is composed of the first stage of inverter 11, and second stage of inverter 21 and third stage of inverter 22, and the output of inverter 22 is connected with the input the inverter 11, thus a cascaded inverter structure is formed. When the control signal $V_{CK}$ is high, because of the feedback effect of the odd level inverter, the output terminal of the third stage of inverter 22 will produce sinusoidal wave, and output to the output terminal $V_{OUT}$ by the fourth stage of inverter 31. The frequency of this sinusoidal wave is decided by the transmission delay time of this three stages of inverters, assume that the delay time of the three stages of inverters are respectively $t_{d1}$, $t_{d2}$, $t_{d3}$, then the frequency of the output signal can be approximated as $$f \approx \frac{1}{t_{d1} + t_{d2} + t_{d3}} \quad (1)$$

The value of $t_{d1}$, $t_{d2}$, $t_{d3}$ represent the mobility of transistors, channel length L, driving voltage $V_H$ and other parameters, which can be expressed as follows (type n=1, 2, 3):

$$t_{dn} \propto \frac{L^2}{\mu(V_H - V_{TH})} \quad (2)$$

When the control signal $V_{CTR}$ is low level, the circuit does not have a high level voltage, so the output terminal will be pulled down to the low voltage $V_L$. In this circuit, the control signal $V_{CTR}$ is the control signal between the high and low level, the output of the ultraviolet light sensing circuit is the pulse wave form modulated by the control signal $V_{CTR}$.

(2) In the Case of No UV Irradiation

In the absence of UV irradiation, the pull-down module of the first stage of inverter 11 is cut off equivalently. As the function of feedback through output of the third stage of inverter 22 is disabled, operation of ring oscillator cannot be maintained. When the control signal $V_{CTR}$ is at a high level, the output of the first and third stage of inverter 11 and inverter 22 will maintain the high level, and the output of second and fourth stage of inverter 21 and inverter 31 will maintain the low level.

When the control signal $V_{CTR}$ is with high level, the output of the first stage of inverter 11 and third stage of inverter 22 will remain at a high level, and correspondingly the second stage of inverter 21 and fourth stage of inverter 31 outputs remain low level.

When the control signal $V_{CTR}$ is low level, the output circuit of the inverter at all stages are low level. Therefore, whether the modulation control signal $V_{CTR}$ is high or low level, in the absence of ultraviolet light radiation, the output of the ultraviolet sensing circuit is low level voltage.

From the analysis of the above principles, ultraviolet light sensing circuit in this disclosure is not limited to the four stages of inverters with cascade structure. Excluding the inverter of output buffer stage, the number of inverters is required to be odd and greater than or equal to three. The output of last inverter is connected to the input of the first inverter in a cascade manner to form a normal ring-oscillating structure. From formula (1), if the number of inverters is increased, then the delay time is increased and the operating frequency is reduced. Therefore, the actual number of stages should be chosen according to the requirements of TFT technology and application.

Figure 4:
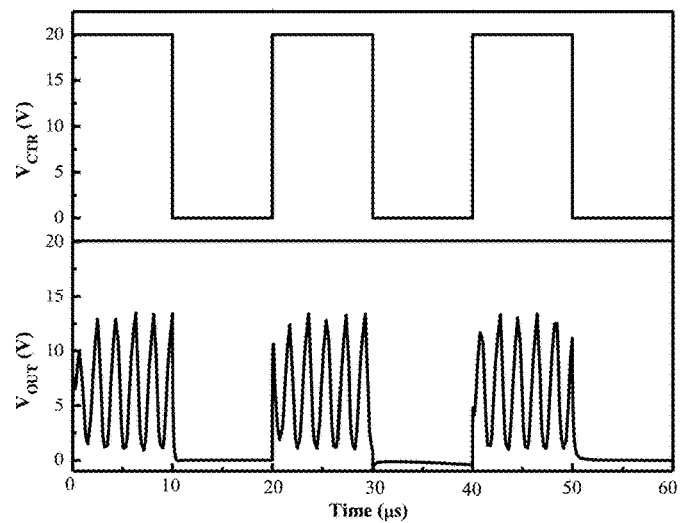
FIG. 4 is an operating waveform of the ultraviolet light sensing circuit in a second embodiment of the present disclosure.

FIG. 4 is an operating waveform of the ultraviolet light sensing circuit with the carrier modulation function in the case of exposing in ultraviolet light in this embodiment. As shown in the output waveform, when control signal $V_{CTR}$ is high level, the oscillating requirement can be met. But when control signal $V_{CTR}$ is low, the output is maintaining the low lever voltage. Here, the frequency of the modulation control signal $V_{CTR}$ is 50 KHz, but the oscillation frequency of the output signal is about 600 kHz. The result shown in the picture proves that, the ultraviolet light sensing circuit in the embodiment of this case can correctly generate the output signal with carrier modulation function corresponding to the presence of ultraviolet light.

Figure 5:
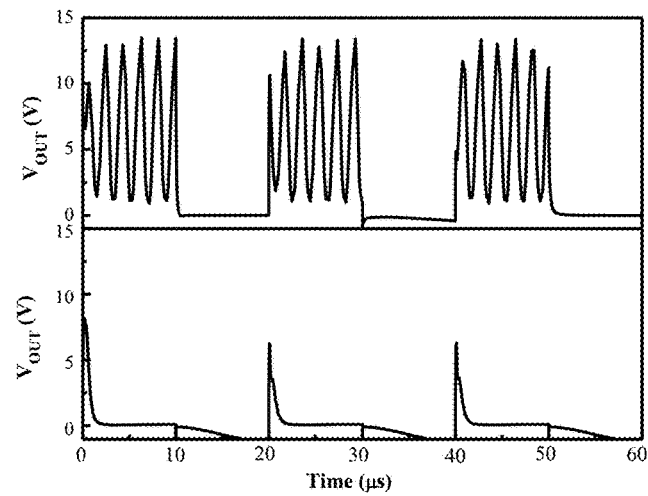
FIG. 5 is output waveform of the ultraviolet light sensing circuit under different illumination conditions in a second embodiment of the present disclosure.

FIG. 5 is the comparison of the output waveform of the circuit in this embodiment without and with ultraviolet light. In the above of FIG. 5, when there is ultraviolet light, the output of the circuit is a pulse voltage with carrier modulation. In the below of FIG. 5, when there is no ultraviolet light, in the rising edge of the control signal $V_{CTR}$, the output waveform will be disturbed and increased, but a regular oscillation waveform can't be formed, so the output is almost maintained the low level. It can be observed in FIG. 5 that, the ultraviolet light can be correctly detected by the embodiment, and there are significant differences in the output waveforms with and without ultraviolet light.

The fourth stage of inverter is introduced in the ultraviolet light sensing circuit of this embodiment as the output buffer, thus the effect of the applied load on the oscillation frequency is reduced. Even in case of large external load transformation, the output of the ultraviolet light sensing circuit is still a sine wave with relatively stable output frequency.

Third Embodiment

Figure 6:
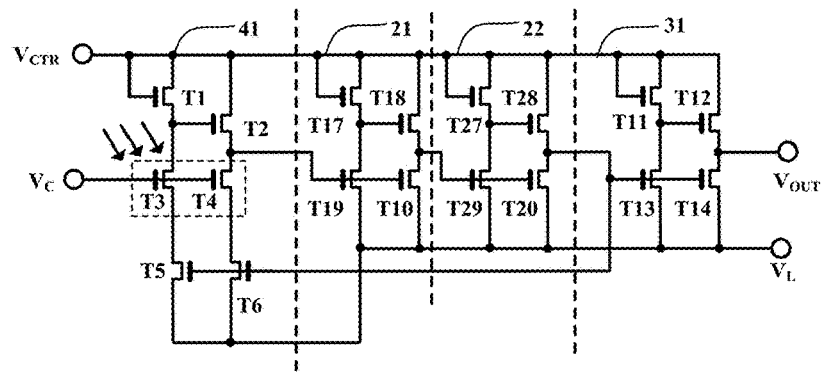
FIG. 6 is a circuit diagram of the ultraviolet light sensing circuit in a third embodiment of the present disclosure.

As shown in FIG. 6, the difference between this embodiment and the second embodiment is that, the control electrode of third transistor T3 and fourth transistor T4 in the first stage of inverter 41 is coupled to the first control signal $V_C$.

For the oxide TFT or other types of ultraviolet light detectors, one important issue is that when the ultraviolet light is removed, the removing of the photo generated carrier is long, which will affect the detection of the two ultraviolet light event whose occurrence time is close. If the induced carriers of the last ultraviolet lighting event lasts for a long time, even if there is no ultraviolet lighting event in the following detection process, false response might be introduced by ultraviolet light sensing circuit. In this embodiment, to avoid the occurrence of this situation, the control electrode of the third transistor T3 and the fourth transistor T4 is coupled to the first control signal $V_C$. Thus the first control signal $V_C$ is used to control the third transistor T3 and the fourth transistor T4. The first control signal $V_C$ switch from the high level to the low level; it can accelerate the removing of the carrier, reduce the signal cross-talk of adjacent detection time, and improve the accuracy of detection.

Fourth Embodiment

Figure 7:
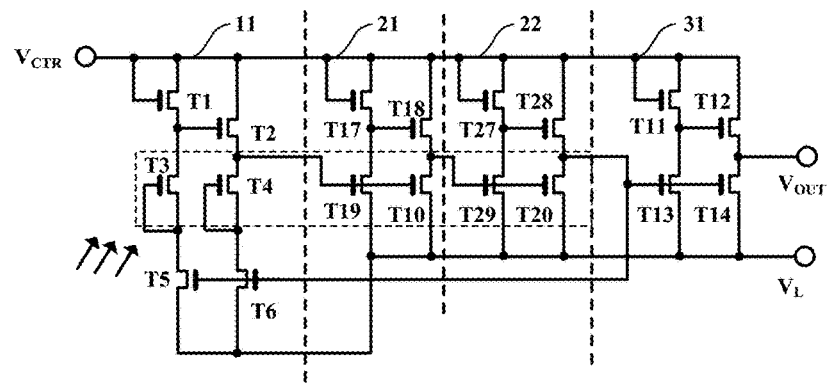
FIG. 7 is a circuit diagram of the ultraviolet light sensing circuit in a fourth embodiment of the present disclosure.

As shown in FIG. 7, the difference between this embodiment and the second embodiment is that, the ninth transistor T9 and tenth transistor T10 of the second stage of inverter 21 and the ninth transistor T29 and tenth transistor T20 of third stage of inverter 22 are all ultraviolet light sensing transistors.

From formula (1), the ring oscillator output signal frequency is mainly determined by the delay time of the inverter at all stages. Thus, by decreasing of the delay time of all stages of each inverter, frequency of the output signal can be increased. In this embodiment, the ninth transistor T19 and tenth transistor T10 of the second stage of inverter 21, and the ninth transistor T29 and tenth transistor T20 of third level inverter 22 are ultraviolet light sensing transistors, and they are placed under ultraviolet light irradiation. Because the delay time of three stages of inverters can be reduced, the frequency of the output signal can be increased.

Fifth Embodiment

Figure 8:
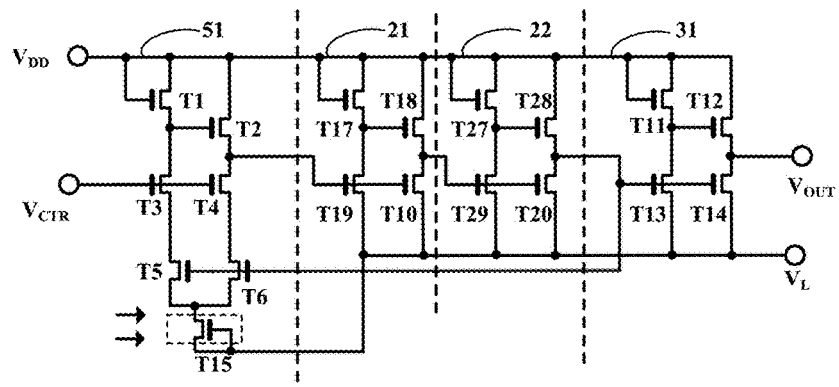
FIG. 8 is a circuit diagram of the ultraviolet light sensing circuit in a fifth embodiment of the present disclosure.

As shown in FIG. 8, the difference between ultraviolet light sensing circuit in this embodiment and the second embodiment is the first stage of inverter 51, as the other circuit structure that are maintaining the same, there is no need to describe any more.

The first stage of inverter 51 of this embodiment comprises a pull-up module and pull-down module; the pull up module comprises the first transistor T1 and the second transistor T2, the control electrode of the first transistor T1 and the first electrode are coupled to the high level signal $V_{DD}$; the control electrode of the second transistor T2 is coupled to the second electrode of the first transistor, the first electrode of the second transistor is coupled to the high level signal $V_{DD}$.

The pull-down module comprises a third transistor T3, a fourth transistor T4, a fifth transistor T5, a sixth transistor T6 and a fifteenth transistor T15, the control electrode of third transistor T3 is coupled to the control signal $V_{CTR}$, the first electrode is coupled to the second electrode of the first transistor T1; the control electrode of third transistor T4 is coupled to the control signal $V_{CTR}$, the first electrode is coupled to the second electrode of the second transistor T2; the fifth control transistor T5 is coupled to the output of the third stage of inverter 22, the first electrode is coupled to the second electrode of the third transistor T3; the control electrode of the sixth transistor T6 is coupled to the output of the third stage of inverter 22, the first electrode is coupled to the second electrode of the fourth transistor T4; the first electrode of the fifteenth transistor T15 is coupled to the second electrode of the fifth transistor T5 and the second electrode of the sixth transistor T6, the control electrode of the fifteenth transistor T15 and the second electrode are coupled to the low level voltage source $V_L$, the fifteenth transistor T15 are ultraviolet light sensing transistor.

In the circuit of second embodiment, when the control signal $V_{CTR}$ is changed from high to low, the pulled down of the internal node to a low level is required to realized through a pull-down circuit, which is similar to the ninth transistor T19. As the control signal $V_{CTR}$ is low, pull-down circuit is almost closed in the second half of the drop stage. Thus the pull down of the internal node and the output node of the ultraviolet sensing circuit can only be achieved through the leakage current. Although the final internal node and the output node of the ultraviolet sensing circuit can achieve the stable low voltage level, but the value of the leakage current is limited, and the process may take a long time. And during this time, the output state of the circuit is uncertain. When the loading resistor is light, the output port can be pulled to a low level voltage in short time; but when the loading resistor or capacitance is heavy, then the output port is floating. Therefore, the output of the ultraviolet light sensing circuit in the first embodiment can only be able to work properly with the matched impedance, and this will limit the application of ultraviolet light sensing circuits.

In the ultraviolet light sensing circuit of this embodiment, the output signal $V_{OUT}$ is modulated by the control signal $V_{CTR}$: when the control signal $V_{CTR}$ is high level, the ring oscillator can work normally in response to ultraviolet light irradiation; when the control signal $V_{CTR}$ is low level voltage, ring oscillator will stop oscillation and export stable low level voltage. In this kind of ultraviolet light sensing circuit, the first electrode of the transistor in the pull-up module is coupled to the high level voltage, the transistor in the pull-down module is coupled to the low level voltage, as a result, the output of circuit and the internal node of the ultraviolet sensing circuit always have a certain level state, instead of a floating state, the output impedance matching problem of the circuit in the first embodiment can be avoided, therefore, the problem of limited application is solved.

Figure 9:
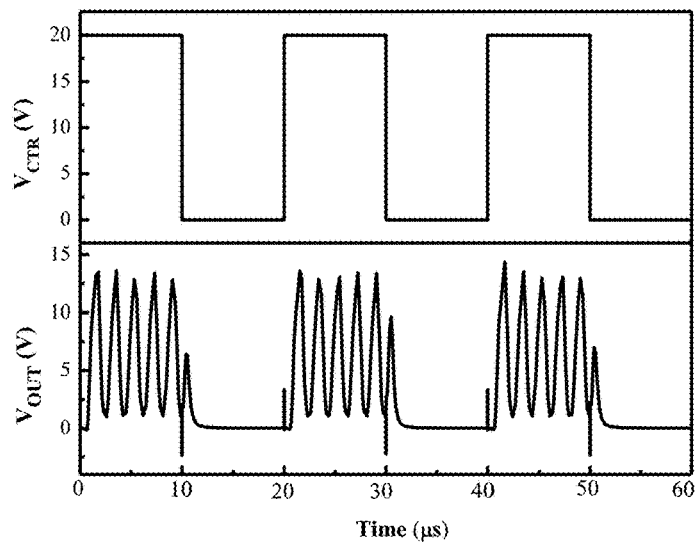
FIG. 9 is an operating waveform diagram of the ultraviolet light sensing circuit in a fifth embodiment of the present disclosure.

As shown in FIG. 9, FIG. 9 is the work waveform when the circuit of this embodiment is in the presence of ultraviolet light. We can see from the figure, when control signal $V_{CTR}$ is in high level period, the output can normally start up; but when control signal $V_{CTR}$ is in low level period, the output is low level voltage. Here, the frequency of the control signal $V_{CTR}$ is 50 kHz, and the oscillation frequency of the output signal is about 500 kHz, the ultraviolet light sensing circuit in this embodiment can correctly generate the output signal with carrier modulation function in the presence of ultraviolet light.

Sixth Embodiment

Figure 10:
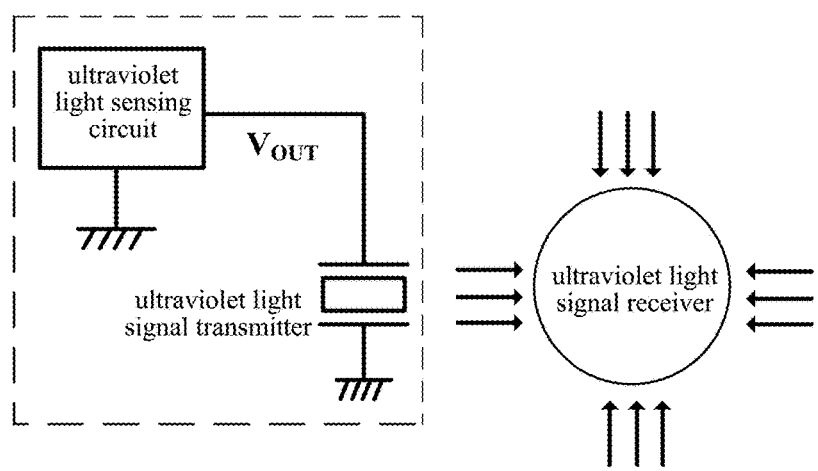
FIG. 10 is a diagram of the UV sensing system in a sixth embodiment of the present disclosure.

As shown in FIG. 10, the ultraviolet light sensing system in this embodiment comprises ultraviolet light signal transmitter, ultraviolet light signal receiver and ultraviolet light sensing circuit, ultraviolet light sensing circuit could be any circuit from the first to fifth embodiment.

The output of the ultraviolet light sensing circuit is coupled to the ultraviolet light signal transmitter, and ultraviolet light signal transmitter is used for transmitting the signal t. And ultraviolet light signal receiver is used for receiving the signal transmitted by the ultraviolet light signal transmitter.

As an embodiment, ultraviolet signal transmitter is a ultrasonic transducer, the ultrasonic signal is generated by the excitation of the output voltage signal of the ultraviolet light sensing circuit and it is transmitted out; ultraviolet light signal receiver receives ultrasonic signal, and transforms ultrasonic signal to electric signal, and based on the electrical signal to determine whether there is ultraviolet lighting or not. For example, the carrier frequency of the output signal $V_{OUT}$ of the ultraviolet light sensing circuit is 20 kHz, and a voltage signal with a frequency of about 600 kHz is superimposed on the carrier, thus the signal frequency is just within the ultrasonic frequency range. The output signal $V_{OUT}$ is transmitted to the ultrasonic transducer renders the ultrasonic transducer to generate ultrasonic signal. Because the ultrasonic signal has good directivity, the ultraviolet light signal receiver will receive modulated ultrasound signal. Then, the ultraviolet signal receiver can be transformed to electrical signal by the ultrasonic transducer. The ultraviolet signal receiver can decode the resulting electrical signal and determine whether the received signal contains the information of ultraviolet light irradiation or not. If ultraviolet light information is contained, then the alarm operation is triggered. In addition, the intensity of the ultraviolet light can be obtained by calculating of the frequency and intensity of the signal.

In an embodiment, a number of ultraviolet light sensing nodes can be placed in a certain range, the ultraviolet sensing node comprises an ultraviolet sensing circuit and an ultraviolet signal transmitter, and they share an ultraviolet signal receiver. Therefore, the geographical position of the ultraviolet ray can be calculated by the position of the ultraviolet sensing node. The ultraviolet sensing system can be arranged in the forest, as the fire warning system; the ultraviolet sensing system can also be placed in the mine as the warning of gas explosion. It can be placed in the gas station and other places of inflammable and explosive as the warning of fire or explosion.

The ultraviolet sensing system of this embodiment has the following advantages:

1) Because the ultraviolet sensing device and the signal modulation circuit are all composed of the oxide TFTs, and the oxide TFT has the advantages of low manufacturing cost and it is convenient for mass production with large area, so cost of the whole set of ultraviolet light sensing system can be decreased;

2) Amplitude modulation wave can be generated by the ultraviolet sensing system, thus it is suitable for wireless communication with long distance;

3) It is highly sensitive to the ultraviolet light, thus the ultraviolet light can be estimated accurately through the pulse intensity and frequency and other information of the output pulses.

4) The configuration of the system is flexible and it can be used in wide range of application, and the ultraviolet light sensing nodes and ultraviolet light signal receiver can be distributed in a wide locations.

The above application of specific example to explain the present disclosure, just to help understand the present disclosure which is not to limit the disclosure. For the general technical personnel in this field, according to the thought of the disclosure, the specific implementation of the above methods can be changed.

We claim:

1. An ultraviolet light sensing circuit, comprising a modulation unit and a phase delay unit, wherein:

the modulation unit comprises a first stage of inverter which is used for induction of ultraviolet light and as a voltage feedback modulation stage;

the phase delay unit is sequentially composed of N stages of inverters, wherein N is even number which is greater than or equal to two;

the modulation unit and the phase delay unit are sequentially connected, and the output voltage of the phase delay unit is feedback to the modulation unit; and the modulation unit is modulated by a control signal which is a pulse signal.

2. The ultraviolet light sensing circuit of claim 1, further comprising an output buffer unit, wherein the output buffer unit comprises N+2 stages of inverters, and is used to improve a driving ability to the ultraviolet light sensing circuit to an output terminal load.

3. The ultraviolet light sensing circuit of claim 2, wherein the first stage of inverter comprises a pull-up module and a pull-down module, and wherein:

the pull-up module comprises a first transistor and a second transistor, a control electrode and a first electrode of the first transistor are coupled to the control signal, a control electrode of the second transistor is coupled to a second electrode of the first transistor, and a first electrode of the second transistor is coupled to the control signal;

the pull-down module comprises a third transistor, a fourth transistor, a fifth transistor and a sixth transistor; a control electrode of the third transistor is coupled to the second electrode, and a first electrode is coupled to the second electrode of the first transistor; a control electrode of the fourth transistor is coupled to the second electrode, and a first electrode is coupled to a second electrode of the second transistor; a control electrode of the fifth transistor is coupled to an output of the N stages of inverters, a first electrode is coupled to a second electrode of the third transistor, and a second electrode is coupled to a low level voltage source; and, a control electrode of the sixth transistor is coupled to the output of the N stages of inverters, a first electrode is coupled to a second electrode of the fourth transistor, and a second electrode is coupled to a low level voltage source; and the third transistor and the fourth transistor are ultraviolet light sensing transistor.

4. The ultraviolet light sensing circuit of claim 3, wherein each stage of inverter in the N stages of inverters are the same circuit structure, comprising a seventh transistor, an eighth transistor, a ninth transistor and a tenth transistor; and wherein:

a control electrode and a first electrode of the seventh transistor are coupled to the control signal; a control electrode of the eighth transistor is coupled to a second electrode of the seventh transistor, and a first electrode of the eighth transistor is coupled to the control signal; a control electrode of the ninth transistor is coupled to the second electrode of the second transistor, a first electrode is coupled to the second electrode of the seventh transistor, and a second electrode is coupled to a low level voltage source; and, a control electrode of the tenth transistor is coupled to the control electrode of the ninth transistor, a first electrode is coupled to a second electrode of the eighth transistor, and a second electrode is coupled to a low level voltage source.

5. The ultraviolet light sensing circuit of claim 4, wherein the ninth transistor and the tenth transistor are ultraviolet sensing transistors.

6. The ultraviolet light sensing circuit of claim 2, wherein the first stage of inverter comprises a pull-up module and pull-down module, and wherein:

the pull-up module comprises a first transistor and a second transistor, a control electrode and a first electrode of the first transistor are coupled to the control signal, a control electrode of the second transistor is coupled to a second electrode of the first transistor, and a first electrode of the second transistor is coupled to the control signal;

the pull-down module comprises a third transistor, a fourth transistor, a fifth transistor and a sixth transistor; a control electrode of the third transistor is coupled to a first control signal, and a first electrode is coupled to the second electrode of the first transistor; a control electrode of the fourth transistor is coupled to the first control signal, and a first electrode is coupled to a second electrode of the second transistor; a control electrode of the fifth transistor is coupled to an output of the N stages of inverters, a first electrode is coupled to a second electrode of the third transistor, and a second electrode is coupled to a low level voltage source; and, a control electrode of the sixth transistor is coupled to the output of the N stages of inverters, a first electrode is coupled to a second electrode of the fourth transistor, and a second electrode is coupled to a low level voltage source; and the third transistor and the fourth transistor are an ultraviolet sensing transistor.

7. The ultraviolet light sensing circuit of claim 2, wherein the first stage of inverter comprises a pull-up module and pull-down module, and wherein:

the pull-up module comprises a first transistor and a second transistor, a control electrode and a first electrode of the first transistor are coupled to a high level signal, a control electrode of the second transistor is coupled to a second electrode of the first transistor, and a first electrode of the second transistor is coupled to the high level signal; and the pull-down module comprises a third transistor, a fourth transistor, a fifth transistor, a sixth transistor and a fifteenth transistor; a control electrode of the third transistor is coupled to the control signal, and a first electrode is coupled to the second electrode of the first transistor; a control electrode of the fourth transistor is coupled to the control signal, and a first electrode is coupled to a second electrode of the second transistor; a control electrode of the fifth transistor is coupled to an output of the N stages of inverters, and a first electrode is coupled to a second electrode of the third transistor; a control electrode of the sixth transistor is coupled to the output of the N stages of inverters, and a first electrode is coupled to a second electrode of the fourth transistor; and, a first electrode of the fifteenth transistor is coupled to a second electrode of the fifth transistor and a second electrode of the sixth transistor, a control electrode and a second electrode of the fifteenth transistor are coupled to a low level voltage source, and the fifteenth transistor is an ultraviolet sensing transistor.

8. The ultraviolet light sensing circuit of claim 2, wherein the N+2 stages of inverters comprises an eleventh transistor, a twelfth transistor, a thirteenth transistor and a fourteenth transistor, and wherein:

a control electrode and a first electrode of the eleventh transistor are coupled to the control signal; a control electrode of the twelfth transistor is coupled to a second electrode of the eleventh transistor, a first electrode of the twelfth transistor is coupled to the control signal, and a second electrode of the twelfth transistor is coupled to an output terminal; a control electrode of the thirteenth transistor is coupled to an output of the N stages of inverters, a first electrode of the thirteenth transistor is coupled to a second electrode of the eleventh transistor, and a second electrode of the thirteenth transistor is coupled to a low level voltage source; and, a control electrode of the fourteenth transistor is coupled to the output of the N stages of inverters, a first electrode of the fourteenth transistor is coupled to the second electrode of the twelfth transistor, and the second electrode of the thirteenth transistor is coupled to a low level voltage source.

9. The ultraviolet light sensing circuit of claim 3, wherein the ultraviolet light sensing transistors are zinc based oxide thin film transistors.

10. An ultraviolet light sensing circuit, comprising an ultraviolet light signal transmitter, an ultraviolet light signal receiver and an ultraviolet light sensing circuit of claim 1, wherein:

an output of the ultraviolet light sensing circuit is coupled to the ultraviolet light signal transmitter, the ultraviolet light signal transmitter is used for transmitting a signal transmitted by the ultraviolet light sensing circuit, and the ultraviolet light signal receiver is used for receiving the signal transmitted by the ultraviolet light signal transmitter and determining presence or absence of ultraviolet radiation in the ultraviolet light sensing circuit by the received signal.

11. The ultraviolet light sensing circuit of claim 10, wherein the ultraviolet light signal transmitter is an ultrasonic transducer which is used to generate and transmit an ultrasonic signal under excitation of an output voltage signal of the ultraviolet light sensing circuit, and the ultraviolet signal receiver receives the ultrasonic signal, restores the ultrasonic signal to an electrical signal, and determines whether the ultraviolet light sensing circuit exists ultraviolet radiation by the electrical signal.

12. The ultraviolet light sensing circuit of claim 5, wherein the ultraviolet light sensing transistors are zinc based oxide thin film transistors.

13. The ultraviolet light sensing circuit of claim 6, wherein the ultraviolet light sensing transistors are zinc based oxide thin film transistors.

14. The ultraviolet light sensing circuit of claim 7, wherein the ultraviolet light sensing transistors are zinc based oxide thin film transistors.

* * * * *